United States Patent
Fuke et al.

[11] Patent Number: 5,911,085
[45] Date of Patent: Jun. 8, 1999

[54] VARIABLE EMISSION ANGLE STROBE LIGHT AND CONTROL METHOD THEREFOR

[75] Inventors: Mitsuo Fuke, Nara; Takashi Umehara; Katsunori Kawabata, both of Osaka; Katsumi Horinishi, Hashimoto, all of Japan

[73] Assignee: West Electric Company, Ltd., Osaka, Japan

[21] Appl. No.: 08/865,013

[22] Filed: May 29, 1997

[30] Foreign Application Priority Data

May 30, 1996 [JP] Japan .................................. 8-136237
Sep. 25, 1996 [JP] Japan .................................. 8-252613

[51] Int. Cl.⁶ .................................................. G03B 17/24
[52] U.S. Cl. ............................... 396/62; 396/175; 362/18
[58] Field of Search ........................... 396/90, 103, 175, 396/61, 62; 362/18

[56] References Cited

U.S. PATENT DOCUMENTS 4,730,201   3/1988   Sasagaki ................................. 396/90
5,486,886   1/1996   Vaynshteyn ........................... 396/175
5,734,934   3/1998   Horinishi et al. .................... 396/175

FOREIGN PATENT DOCUMENTS 55-129326   10/1980   Japan .

Primary Examiner—David M. Gray
Attorney, Agent, or Firm—Panitch Schwarze Jacobs & Nadel, P.C.

[57] ABSTRACT

In order to vary a light emission angle, a light source is moved so that its position relative to a reflector is varied. In one mode, by compulsively moving the light source to one end of a movement range of the light source, the one end is set as an original position. In another mode, after the light source is compulsively moved to the one end, by detecting that the light source has reached a position preset in the movement range while the light source is being moved to the other end of the movement range, a distance by which the light source is moved from the one end to the preset position is detected and stored as control information. The subsequent operation to move the light source to a desired control position is controlled based on the original position which is the one end or based on the control information.

15 Claims, 5 Drawing Sheets

VARIABLE EMISSION ANGLE STROBE LIGHT AND CONTROL METHOD THEREFOR

BACKGROUND OF THE INVENTION

The present invention relates to a variable emission angle strobe light in which a light emission angle is varied by varying the position of a light source relative to a reflector and a method for controlling a movement of the light source in the strobe light corresponding to the focal length set in a camera lens. More particularly, the invention relates to a variable emission angle strobe light which highly accurately and inexpensively realizes the setting of the light emission angle corresponding to the focal length set in the camera lens and a method for controlling the movement of the light source in the strobe light.

As a conventional variable emission angle strobe light in which the light emission angle is varied by varying the position of the light source relative to the reflector, a light distribution angle varying device of an electronic flash for cameras (hereinafter, referred to as first prior art) is known, which is disclosed in the Japanese Published Unexamined Patent Application Sho 62-51453.

The light distribution angle varying device according to the first prior art comprises, as shown in FIG. 5A and FIG. 5B, a front reflector 1 fixed to a fixing member (not shown), a rear reflector 2 situated at the bottom of the front reflector 1 and having a light source 3 such as a flash discharge tube, and a driver (not shown) for causing the rear reflector 2 and the light source 3 to reciprocate independently of each other in the direction of arrow A.

When the light source 3 emits light, a subject (not shown) is irradiated with distributed light, i.e. with a luminous flux 3a directly emitted from the light source 3, a luminous flux 3b first reflected by the rear reflector 2 and then traveling toward the center, and a luminous flux 3c reflected by the front reflector 1.

As shown in FIG. 5A, when the rear reflector 2 and the light source 3 move rightward and become away from the front reflector 1, the luminous fluxes 3a, 3b and 3c are condensed as the light source 3 moves toward the bottom of the front reflector 1 (in the direction of arrow B), so that the light distribution condition becomes the one suitable for a narrow angle of view of a telephoto lens (not shown).

As shown in FIG. 5B, the luminous fluxes 3a, 3b and 3c are diffused as the rear reflector 2 having the light source 3 moves from the bottom side toward the open side (in the direction of arrow C), so that the light distribution condition becomes the one suitable for a wide angle of view of a wide-angle lens (not shown). With this arrangement, only by slightly moving the light source 3, the emission angle of the light emitted by the light source 3 is varied in correspondence with the angle of view of the lens being used.

For example, in a camera for 35 mm standard film, in order to obtain the light emission angle corresponding to the angle of view of a camera lens with a focal length range of 24 mm to 85 mm, according to the device of the above-described structure of the first prior art, the light source 3 is moved approximately 4 mm relative to the reflector 1. On the contrary, in another very typical conventional arrangement (hereinafter, referred to as second prior art), a Fresnel lens is disposed in front of the reflector, and the light source and the reflector are integrally moved relative to the Fresnel lens. In this arrangement, in order to obtain the light emission angle corresponding to a photographic image plane of the camera lens having a focal length range of 24 mm to 85 mm, the light source is necessarily moved approximately 20 mm. Compared therewith, the device of the first prior art is capable of controlling the light emission angle with an extremely small movement amount of the light source. As a result, it is expected that the first prior art produces an advantage of largely reducing the size of the strobe light.

In the light distribution angle varying device of the arrangement according to the first prior art, however, since the light source 3 is moved relative to the reflector 1, a slight deviation of the movement amount of the light source 3 leads to a great variation in light emission angle. For this reason, the device intrinsically has a problem that the operation to move and stop the light source 3 is necessarily controlled with extremely high accuracy.

Specifically, as to the amount of change in corresponding focal length when an element such as the reflector to be moved is moved 1 mm, in the case of the arrangement according to the second prior art, the amount of change is (85−24)/20=3.05 mm. On the other hand, in the case of the arrangement according to the first prior art, the amount of change is (85−24)/4=15.25 mm. Thus, in the first prior art, the focal length range corresponding to a 1-mm movement of the element to be moved is extremely wide. In other words, a slight movement of the light source 3 greatly changes the corresponding focal length, so that the positioning is necessarily controlled with extremely high accuracy.

The variation in guide number caused when the element to be moved is moved 1 mm is approximately 0.1 EV in the case of the second prior art which integrally moves the light source and the reflector. On the contrary, in the case of the first prior art which moves the light source 3, the variation is approximately 0.5 EV. Thus, in view of the guide number variation characteristic, the positioning of the light source is necessarily controlled with high accuracy.

As a result of an experiment carried out by the inventors of the present invention, it was confirmed that, for example, when a flash discharge tube with a total length of approximately 50 mm was used as the light source, the positioning of the light source relative to the reflector is necessarily made with an accuracy of ±0.1 mm. Therefore, in the case where the movement of the light source is automatically controlled, it is considered to use a stepping motor as the driving unit of the driver for the automatic control. The stepping motor is capable of extremely accurately and instantly moving the light source by a predetermined distance and stopping it.

However, even if the light source is accurately moved and stopped by use of the stepping motor, in view of mass production, it is very difficult to assemble the reflector and the light source so that the accuracy of the positional relationship between the reflector and the light source is ±0.1 mm. That is, not only the emission angle at a reference position of the light source in the light distribution angle varying device but also the emission angles at moved positions of the light source deviate from the design values. Therefore, the above-described arrangement intrinsically has a defect that it is impossible to realize an accurate light distribution condition corresponding to the angle of view of the lens being used.

In order to cope with the defect, for example, a position detection unit is provided which is capable of detecting a predetermined position of the light source within a movement range of the light source. It is considered to arrange the light distribution angle varying device so that, by using the position detected by the position detection unit as the reference position, the movement position of the light source is controlled based on the number of steps of the stepping motor from the reference position.

In this arrangement, the light source is returned to the reference position before being moved. By assembling the device so that the light source is situated within the movement range thereof, the movement of the light source is desirably controlled regardless of the assembly accuracy. For example, the reference position relative to the reflector is adjusted so as to be correctly recognized as the absolute position corresponding to a predetermined light distribution condition and the adjusted reference position is set, so that the operation to move the light source can be carried out in correspondence with the control varying operation of the light distribution angle.

The adjustment and setting method to accurately recognize the reference position will be described hereafter. For example, the position detection unit is arranged so that the position detectable as the position of the light source is variable within the movement range of the light source. The light source is also arranged so that the light distribution characteristic of the light source is measurable. A method is considered to adjust the position of the light source detected by the position detection unit so that the light distribution characteristic obtained when the light source emits light after being moved to a currently detectable position is a predetermined reference light distribution characteristic (light distribution characteristic at the reference position).

However, according to this method, a light distribution measuring device which is large-sized and expensive is necessarily provided in the manufacturing process and the structure of the position detection unit is complicated. In addition, some time is necessary for the adjustment. Thus, the method has defects which renders it disadvantageous in mass productivity and manufacturing cost.

BRIEF SUMMARY OF THE INVENTION

An object of the present invention is to provide a variable emission angle strobe light capable of controlling an emission angle by recognizing the position of a light source relative to a reflector and moving the light source to an appropriate position with a simple structure. A further object of the present invention is to provide the variable emission angle strobe light capable of highly accurately and inexpensively realizing the variation and setting of the light emission angle corresponding to a focal length set in a camera lens with a simple stricture, and a method for controlling the movement of the light source in the variable emission angle strobe light.

In a variable emission angle strobe light according to a first aspect of the present invention, a light source moved relative to a reflector in order to vary the light emission angle is compulsively moved to one end of a movement range of the light source, and the one end is set as the original position. The operation to move the light source to a desired control position is controlled based on the original position which is the one end, and the operation to compulsively move the light source to the one end is performed at least every time that the operation to move the light source to the desired control position is performed a predetermined number of times.

In a variable emission angle strobe light according to a second aspect of the present invention, a light source moved relative to a reflector in order to vary the light emission angle is first compulsively moved to one end of the movement range of the light source and then moved to the other end of the movement range, and by detecting that the light source has reached a preset reference position while being moved to the other end, a distance by which the light source is moved from the one end to the reference position is detected and stored as control information. The operation to move the light source is controlled based on the stored control information.

In a method for controlling a movement of a light source according to the present invention, a light source moved relative to a reflector in order to vary the light emission angle is first compulsively moved to one end of a movement range of the light source, and then moved to the other end of the movement range, and by detecting that the light source has reached a reference position preset in the movement range while being moved to the other end, a distance by which the light source is moved from the one end to the reference position is detected and stored as control information. Then, the operation by a driving unit to move the light source is controlled based on the control information.

DETAILED DESCRIPTION OF THE INVENTION

[First Embodiment]

Figure 1:
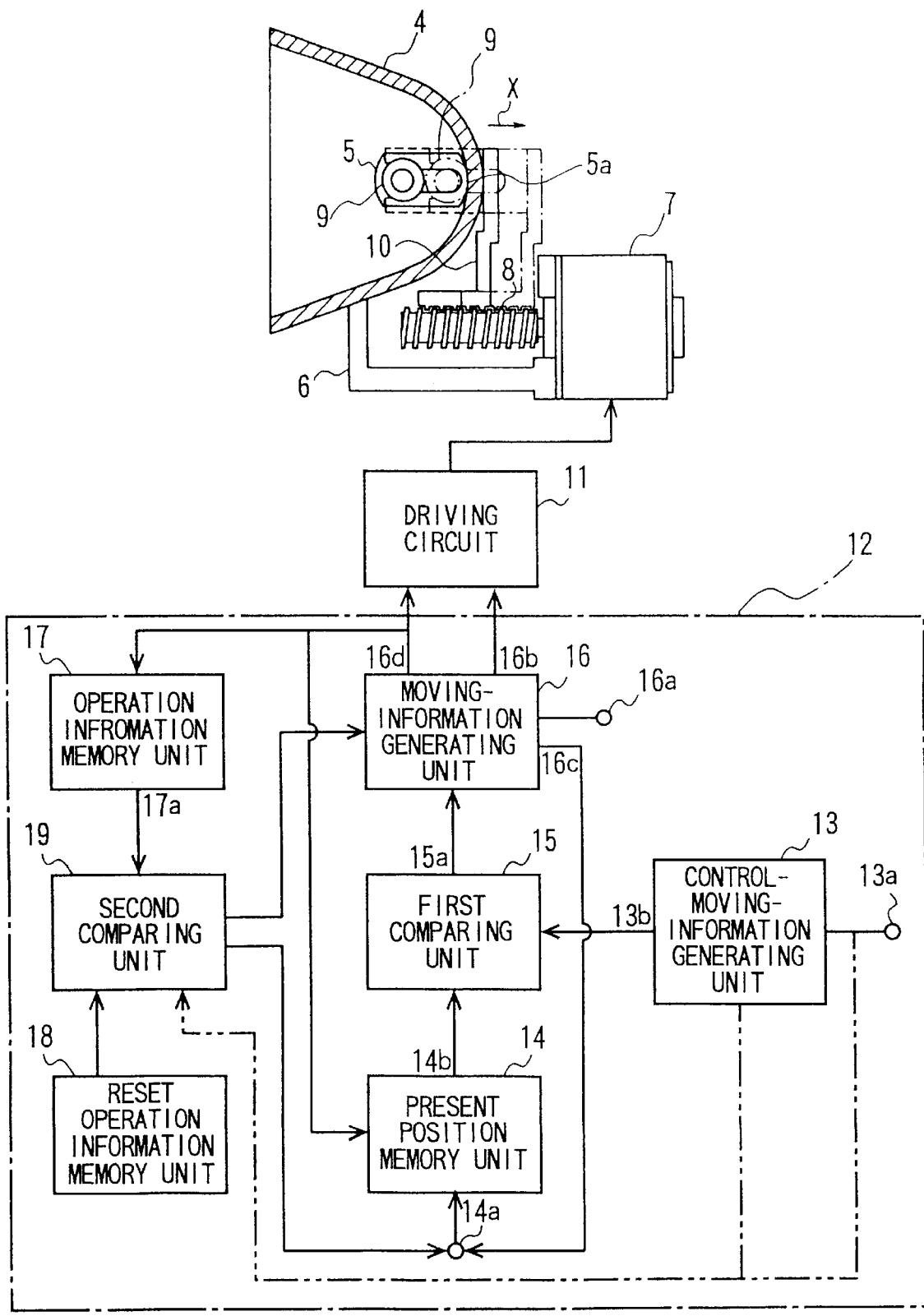
FIG. 1 is a schematic view including a partial cross section, showing the basic arrangement of a first embodiment of a variable emission angle strobe light according to the present invention.

FIG. 1 is a schematic view including a partial cross section, showing the basic arrangement of a first embodiment of a variable emission angle strobe light according to the present invention.

The first embodiment is an example where the operation to compulsively move the light source can also be performed based on how many times a control operation has been performed, power-on and a predetermined command operation as described hereafter in detail.

The variable emission angle strobe light shown in FIG. 1 includes: a reflector 4 being semioval in cross section and having at a side thereof a light source moving slot 5 which defines the movement range of a subsequently-described light source 9; and a driving unit 7 comprising, for example, a stepping motor fixed to a fixing stand 6. For example, the right end of the light source moving slot 5 is defined as an original position 5a. To the output shaft of the driving unit 7, a worm wheel 8 is fixed so as to rotate normally or in reverse. A light source holding member 10 which reciprocates by being engaged with the worm wheel 8 has the light source 9 comprising, for example, a flash discharge tube. The light source 9 reciprocates in the light source moving slot 5 of the reflector 4. A driving circuit 11 drives the driving unit 7 in accordance with driving signals being supplied. A control unit 12 generates various driving signals for controlling the driving operation by the driving unit 7 and supplies the signals to the driving circuit 11.

The control unit 12 in the first embodiment includes, as shown in FIG. 1, a control-moving-information generating unit 13, a present position memory unit 14, a first comparing unit 15, a moving-information generating unit 16, an operation information memory unit 17, a reset operation information memory unit 18 and a second comparing unit 19. These units will be described in detail.

Focal length information corresponding to a set focal length set in the camera lens is input from an input terminal 13*a* of the control-moving-information generating unit 13. At the control-moving-information generating unit 13, a movement amount necessary for moving the light source 9 from the original position 5*a* to a desired control position obtaining the light emission angle corresponding to the set focal length is set and output as control moving information.

The present position memory unit 14 detects the present position of the light source 9 as the amount of movement from the original position 5*a* based on the driving signals for moving the light source 9 output from the moving-information generating unit 16, and stores the position as present position information. The contents of the storage are supplied from an output terminal 14*b* to the first comparing unit 15. When reset information is input from the second comparing unit 19 to a reset terminal 14*a*, the present position memory unit 14 resets the contents of the storage to the contents representative of the original position with the highest priority.

The first comparing unit 15 compares the present position information stored in the present position memory unit 14 and the control moving information set and output by the control-moving-information generating unit 13 to obtain the difference therebetween, and outputs plus or minus sign information and absolute value information of the difference.

The moving-information generating unit 16 receives the sign information and the absolute value information, and generates from a terminal 16*d* moving information for moving the light source 9 from the present position to the desired control position. The moving information is supplied not only to the driving circuit 11 as a driving signal but also to the present position memory unit 14 and to the operation information memory unit 17.

To the moving-information generating unit 16, information representative of power-on or a predetermined command signal is input through a compulsion input terminal 16*a*. The moving-information generating unit 16 is also supplied with control information from the second comparing unit 19. Consequently, the moving-information generating unit 16 generates, prior to the generation of the moving information, compulsive moving information for compulsively moving the light source 9 to the original position 5*a* which is one end of the light source moving slot 5 that is the movement range of the light source 9. The compulsive moving information is supplied to the driving circuit 11 as a driving signal.

Concurrently therewith, the moving-information generating unit 16 outputs to the reset terminal 14*a* of the present position memory unit 14 the compulsion setting information for commanding reset its storage contents to the contents representative of the original position 5*a* with the highest priority.

The operation information memory unit 17 receives the moving information output by the moving-information generating unit 16, and detects and stores as operation information how many times the moving-information generating unit 16 has operated. The stored operation information is supplied to the second comparing unit 19. The reset operation information memory unit 18 stores reset operation information preset to detect that the moving-information generating unit 16 has operated a predetermined number of times. The stored reset operation information is supplied to the second comparing unit 19.

The second comparing unit 19 compares the operation information supplied from the operation information memory unit 17 and the reset operation information supplied from the reset operation information memory unit 18. When it is detected that the operation condition of the moving-information generating unit 16 has reached a predetermined operation condition, specifically, when it is detected that the moving-information generating unit 16 has operated a predetermined number of times, the second comparing unit 19 generates the control information for compulsively moving the light source 9 to the original position 5*a* which is one end of the movement range defined by the reflector 4 and the reset information for resetting the storage contents of the present position memory unit 14 to the contents representative of the original position 5*a*. For example, as shown by the chain double-dashed line in FIG. 1, the control information is supplied to the moving-information generating unit 16 in response to the start of supply of the next focal length information to the control-moving-information generating unit 13 and the start of the next operation of the control-moving-information generating unit 13. The reset information is supplied to the present position memory unit 14.

Subsequently, description is made as to operation for controlling the light emission angle in the variable emission angle strobe light of the first embodiment having the arrangement as described above.

The first embodiment employs, for example, a stepping motor as the driving unit 7. In driving the stepping motor, a control table is referred to which previously stores the corresponding focal length of the camera lens as the number of driving pulses from a specific original position. The stepping motor is controlled by obtaining from the control table the number of driving pulses necessary for moving the light source so as to correspond to a specific focal length.

Assume now that in the variable emission angle strobe light of the first embodiment, the light source 9 is situated on the left side as shown in FIG. 1 and power is turned on under this condition.

First, information responding to the power-on is input to the moving-information generating unit 16 through the compulsion input terminal 16*a*. The moving-information generating unit 16 generates the compulsive moving information for compulsively moving the light source 9 to the original position 5*a* which is one end of the movement range defined by the reflect or 4. The compulsive moving information is supplied from an output terminal 16*b* to the driving circuit 11.

Consequently, the driving circuit 11 drives the stepping motor serving as the driving unit 7. Whereby the worm wheel 8 is driven, and the light source holding member 10 for holding the light source 9 compulsively moves the light source 9 in the direction of arrow X so as to be situated, for example, at the original position 5a at a slot right end in the light source moving slot 5 of the reflector 4. The light source 9 eventually reaches the original position 5a at the mechanical movement limit where the light source 9 abuts the slot right end as shown in the dash and dotted line. That is, the light source 9 compulsively positioned at the right end of the movement range defined by the light source moving slot 5 of the reflector 4.

The moving operation is performed by driving the stepping motor. For example, a greater number of driving pulses than the number of driving pulses necessary for moving the light source 9 from one end to the other end of the movement range defined by the light source moving slot 5 of the reflector 4 is supplied to the stepping motor.

Concurrently therewith, the moving-information generating unit 16 outputs the compulsion setting information from an output terminal 16c and applies it to the reset terminal 14a of the present position memory unit 14. The compulsion setting information commands that the storage contents of the present position memory unit 14 be reset to the contents representative of the original position 5a with the highest priority. As a result, the present position memory unit 14 operates to reset the storage contents to the contents representative of the original position 5a with the highest priority.

In the variable emission angle strobe light of the type which controls the light emission angle based on the positional relationship between the light source 9 and the reflector 4, the absolute position of the light source 9 relative to the reflector 4, for example, the distance from one end of the movement range of the light source 9 directly corresponds to the light emission angle. The relationship between the distance and the light emission angle is decided when the device is designed. In this embodiment, the compulsively moved position of the light source 9 set by performing the above-described operation is the original position in setting the light emission angle.

In other words, regardless of positional accuracy in assembly of the reflector 4, the position at one end to which the light source 9 is compulsively moved is recognized and used as the original position 5a for the operation to control the movement of the light source 9 in setting the light emission angle.

Consequently, in this embodiment, even when the reflector 4 is situated in a position different from the design position due to an assembly error, after the operation to compulsively move the light source 9 has been performed, the relationship between the absolute positions of the reflector 4 and the light source 9 is maintained by driving the stepping motor with the original position 5a as the reference. As a result, the light source 9 is accurately moved to a desired position regardless of positional accuracy in assembly of the reflector 4.

Under the condition where the operation has been performed to compulsively move the light source 9 to one end of the movement range defined by the reflector 4, set focal length information corresponding to a focal length W set in the camera lens is input to the input terminal 13a of the control-moving-information generating unit 13.

For convenience of explanation, the original position 5a is referred to as "0", a predetermined direction in which the light source 9 is movable therefrom, as "plus direction", and a direction opposite thereto, as "minus direction". For example, in FIG. 1, the plus direction is the leftward direction. It is assumed that the light emission angle corresponding to the photographic angle of view at the set focal length W can be set by driving the stepping motor in the plus direction from the original position 5a by 20 steps in the number of driving steps of the stepping motor. That is, in the control table, "+20" is stored for the set focal length W.

In order to move the light source 9 from the original position 5a to the desired control position where the light emission angle corresponding to the set focal length W is set, the control-moving-information generating unit 13 takes out the number of driving steps "+20" of the stepping motor from the control table and outputs it from an output terminal 13b to the first comparing unit 15 as the control moving information.

The first comparing unit 15 compares information "0" representative of the original position 5a stored in the present position memory unit 14 and supplied from the output terminal 14b with the control moving information "+20". Then, the first comparing unit 15 subtracts the present position information from the control moving information to obtain the difference therebetween and detects whether the present position is in the plus direction or in the minus direction with respect to the position represented by the newly supplied control moving information. The first comparing unit 15 also detects the distance represented by the number of driving steps of the stepping motor. Then, the first comparing unit 15 subtracts the present position information from the control moving information to obtain the difference therebetween. The sign information "+" and the absolute value information "20" of the difference are output from an output terminal 15a and applied to the moving-information generating unit 16.

When receiving the sign information "+" and the absolute value information "20" output by the first comparing unit 15, the moving-information generating unit 16 generates moving information for moving the light source 9 from the original position 5a which is the present position to a desired control position based on the sign and absolute value information. The moving information is supplied from the output terminal 16d to the driving circuit 11 as a driving signal.

The driving circuit 11 drives the stepping motor serving as the driving unit 7 based on the sign information "+" and the absolute value information "20", so that the light source 9 is driven in the plus direction from the original position 5a by 20 steps in the number of driving steps of the stepping motor and is moved to a desired control position where the light emission angle is set which corresponds to the photographic angle of view of the set focal length W.

The driving signal is supplied to the present position memory unit 14 as control information for setting the new present position. The driving signal is also supplied to the operation information memory unit 17 as operation information for detecting and storing how many times the moving-information generating unit 16 has operated.

Based on the supplied driving signal, the present position memory unit 14 detects the present position of the light source 9 as the number of driving steps "+20" of the stepping motor which is the movement amount from the original position "0". Then, the present position memory unit 14 stores the detection result "+20" as the new present position information.

In response to the supplied moving information, the operation information memory unit 17 detects and stores as the operation information how many times the moving-information generating unit 16 has operated. The operation information is supplied from an output terminal 17a to the second comparing unit 19.

Suppose that under this condition, in order to perform the next photographing, set focal length information corresponding to a set focal length V set in the camera lens is newly input to the input terminal 13a of the control-moving-information generating unit 13. It is assumed that the light emission angle corresponding to the photographic angle of view of the set focal length V is set by driving the light source 9 from the original position 5a in the plus direction by 5 steps in the number of driving steps of the stepping motor. That is, in the control table, "+5" is stored for the set focal length V.

In order to move the light source 9 from the original position 5a to a desired control position where the light emission angle is set which corresponds to the set focal length V, the control-moving-information generating unit 13 takes out the number of driving steps of the stepping motor "+5" from the control table. The number of driving steps "+5" is output from the output terminal 13b to the first comparing unit 15 as control moving information. The first comparing unit 15 compares the control moving information with the present position information stored in the present position memory unit 14.

In this case, the present position information stored in the present position memory unit 14 is not "0" representative of the original position 5a but "+20". Therefore, the control moving information "+20" is subtracted from the control moving information "+5" for the comparison. That is, the difference therebetween "+5−(+20)" is obtained. As a result, the sign information "−" and the absolute value information "15" of the difference are output from the output terminal 15a to the moving-information generating unit 16.

Then, based on the supplied sign and absolute value information "−" and "15", the moving-information generating unit 16 generates moving information for moving the light source 9. The moving information is supplied to the driving circuit 11 as a driving signal, so that the driving circuit 11 drives the stepping motor based on the sign information "−" and the absolute value information "15". The light source 9 is moved in the minus direction from the present position by 15 steps in the number of driving steps of the stepping motor and is set in a desired control position where the light emission angle is set which corresponds to the set focal length V.

Concurrently therewith, based on the supplied driving signal, the present position memory unit 14 detects a present position of the light source 9 from the difference between the position "+20" and the number of driving steps "−15" which is the movement amount. The present position memory unit 14 stores the detection result "+5" as new present position information.

In response to the supplied moving information, the operation information memory unit 17 detects and stores as the operation information how many times the moving-information generating unit 16 has operated. In the above case, since the moving-information generative unit 16 has operated twice, the moving information memory unit 17 detects and stores "2". The operation information is supplied to the second comparing unit 19.

In the variable emission angle strobe light according to the first embodiment, every time the focal length of the camera lens is set, and corresponding set focal length information is supplied, the driving circuit 11, the control-moving-information generating unit 13 and the moving-information generating unit 16 perform the operations as described above. By these operations, the light source 9 is moved and positioned in a desired control position in accordance with the focal length of the camera lens.

Further, in the variable emission angle strobe light according to the first embodiment, the second comparing unit 19 compares the operation information stored in the operation information memory unit 17 with the reset operation information corresponding to a predetermined number of times stored in the reset operation information memory unit 18. Then, it is detected whether the operation to move the light source 9 has been performed the predetermined number of times or not.

When the moving-information generating unit 16 has operated the predetermined number of times, i.e. when it is detected that the operation condition of the moving-information generating unit 16 has reached a predetermined operation condition, the second comparing unit 19 generates control information and reset information for resetting the storage contents of the present position memory unit 14 to the contents representative of the original position 5a. The control information and the reset information are supplied to the moving-information generating unit 16 and the present position memory unit 14 in response to the start of the next operation of the control-moving-information generating unit 13.

Then, when the focal length of the camera lens is newly set and corresponding set focal length information is supplied, by the driving circuit 11, the control-moving-information generating unit 13 and the moving-information generating unit 16, the light source being situated in the original position 5a is moved and positioned in a desired control position corresponding to the new focal length of the camera lens.

By these operations performed by the operation information memory unit 17, the reset operation information memory unit 18 and the second comparing unit 19, the light source 9 is compulsively returned to the original position 5a, in other words, the original position 5a is confirmed. Consequently, the above-described operation to control the movement of the light source 9 to a desired control position is highly accurately and correctly performed.

When a stepping motor is used as the driving unit 7, a trouble such as loss of synchronism is sometimes caused because of the stepping motor not correctly performing the stepping operation in response to the driving pulse. When the loss of synchronism occurs, there is a possibility that the light source 9 is not accurately moved to the desired control position. In order to cope with such a case, the reset operation information corresponding to the predetermined number of times which information is set and stored in the reset operation memory unit 18 is selected to an appropriate value in consideration of the frequency of occurrence of the trouble. As a result, even if the trouble occurs, there is hardly any possibility that it affects the movement of the light source 9. That is, the operation to control the movement of the light source 9 is highly accurately and surely performed by use of the stepping motor.

As described above, according to the first embodiment, by compulsively moving the light source 9 to one end of the movement range defined by the reflector 4, the one end is set as the original position 5a in moving the light source 9. Based on the original position 5a, the operation is controlled which is performed by the control unit 12 to control the driving unit 7 for moving the light source 9, and the operation to move the light source 9 to the one end, i.e. the operation to confirm the original position 5a is performed every time the operation to move the light source 9 to the desired control position is performed a predetermined number of times.

In the variable emission angle strobe light according to the present invention, the series of control operations such as the operation to move the light source 9 to one end of the movement range, the operation to set the one end as the original position 5a and the operation to move the light source 9 to the desired control position by controlling the operation of the driving unit 7 based on the original position 5a are performed by use of an electrically processing device such as the control unit and driving circuit.

Therefore, the desired control position of the light source 9 is instantly and accurately obtained with a simple structure without any manual adjustment. As a result, a variable emission angle strobe light is provided which highly accurately and inexpensively realizes the setting of the light emission angle corresponding to the focal length set in the camera lens being used.

[Second Embodiment]

Figure 2:
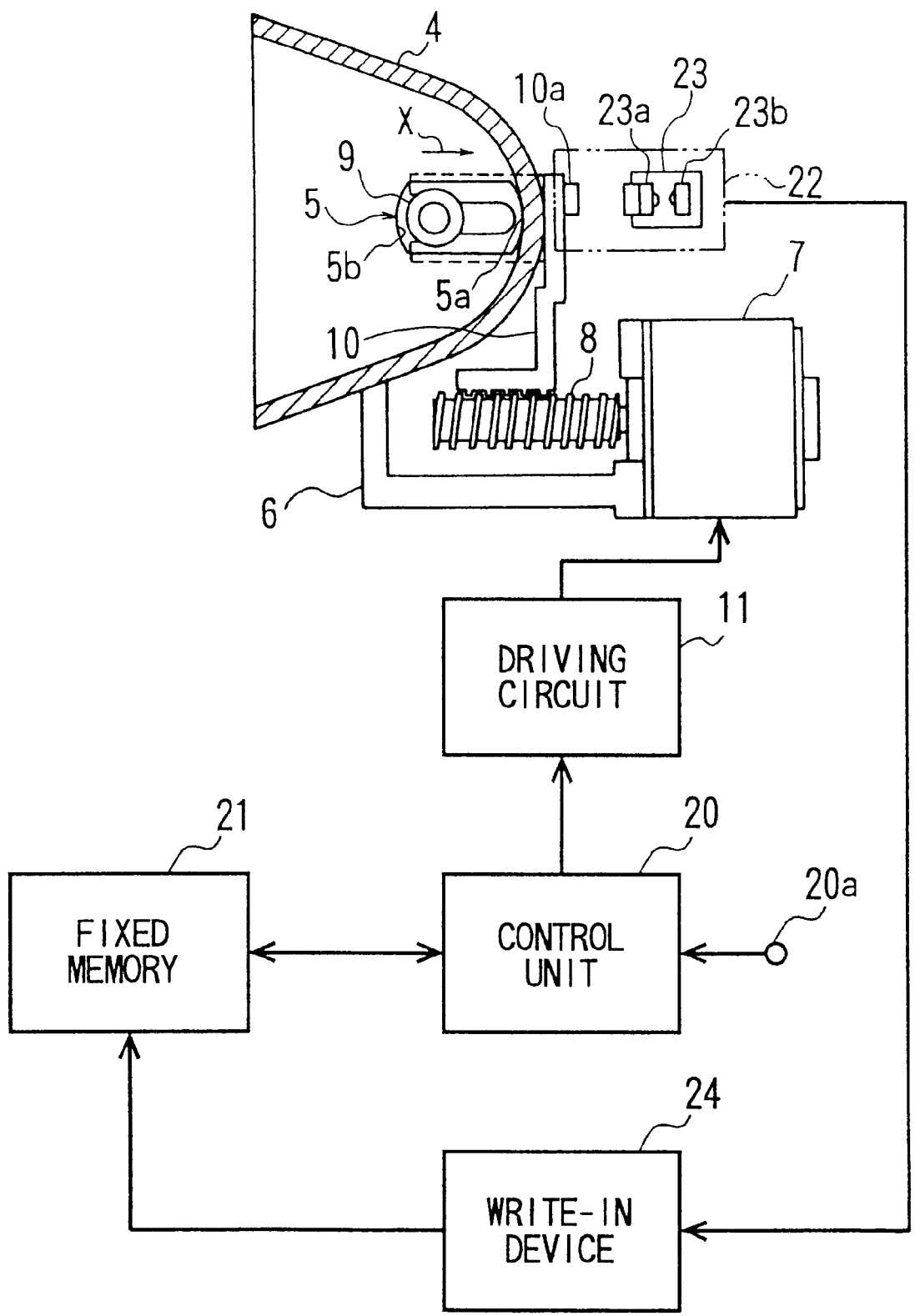
FIG. 2 is a schematic view including a partial cross section, showing the arrangement of a second embodiment of the variable emission angle strobe light according to the present invention.
Figure 3:
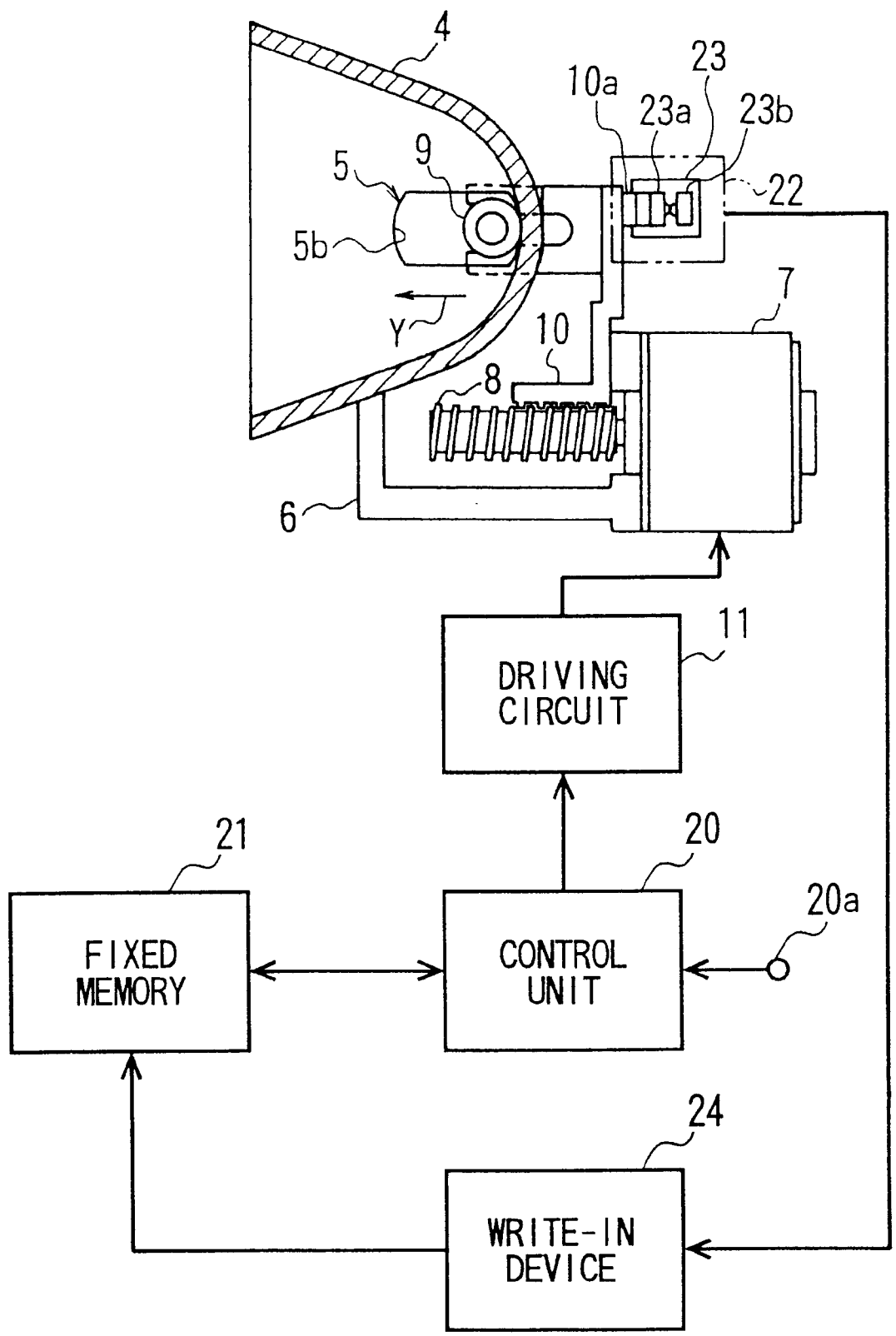
FIG. 3 is a schematic view including a partial cross section, showing an example of operation condition of the second embodiment shown in FIG. 2.

FIG. 2 and FIG. 3 are schematic views including partial cross sections, showing a second embodiment of the variable emission angle strobe light according to the present invention. In FIG. 2 and FIG. 3, the elements denoted by the same reference designations as those of FIG. 1 are elements having the same functions.

As shown in FIG. 2, like in the first embodiment, the reflector 4 is substantially semioval in cross section and has at a side thereof the light source moving slot 5 mechanically defining the movement range of the light source. To the fixing stand 6, the driving unit 7 comprising, for example a stepping motor is fixed. To the output shaft of the driving unit 7, the worm wheel 8 is fixed so as to rotate normally or in reverse. With the worm wheel 8, the light source holding member 10 is engaged so as to reciprocate. The light source holding member 10 has the light source 9 comprising a flash discharge tube. The light source holding member 10 causes the light source 9 situated in the reflector 4 to reciprocate in the light source moving slot 5 of the reflector 4. The driving unit 7 is driven by the driving circuit 11.

To a control unit 20, set focal length information corresponding to the focal length set in the camera lens is input from an input terminal 20a, so that a driving signal for controlling the operation of the driving unit 7 is output and supplied to the driving circuit 11. A fixed memory 21 comprising, for example, an electrically erasable programmable read only memory (EEPROM) for writing predetermined control information thereinto is connected to the control unit 20.

A light-source-position detection unit 22 includes a protrusion member 10a provided at a part of the light source holding member 10, and a detection switch 23 having a pair of contact pieces 23a and 23b. The detection switch 23 is fixed to a fixing member omitted from the figure in a predetermined position within the movement range of the light source 9. The light-source-position detection unit 22 detects that the light source 9 has reached the predetermined position.

A write-in device 24 includes an information detecting section and a data writing section. The information detecting section detects as control information the distance by which the light source 9 is moved from one end of the movement range to the position where the light-source-position detection unit 22 operates in the case where the light source 9 is first compulsively moved to the one end of the movement range and then moved to the other end of the movement range. The data writing section writes the control information into the fixed memory 21. The write-in device 24 is provided outside the variable emission angle strobe light.

The control unit 20 comprise a known microcomputer, and includes a correcting section which corrects the driving signal supplied to the driving circuit 11 into a corrected driving signal in response to the control information written in the fixed memory 21.

Subsequently, with reference to FIG. 3, a light emission angle control operation in the second embodiment of the present invention having the above-described arrangement will be described together with a method for controlling the movement of the light source 9.

In the variable emission angle strobe light of the second embodiment, it is assumed that the light source 9 is situated on the left side in the light source moving slot 5 as shown in FIG. 2 and power is turned on under this condition.

First, the control unit 20, the driving circuit 11 and the driving unit 7 operate to compulsively move the light source 9 to the original position 5a at one end of the movement range.

Specifically, the driving unit 7 operates to rotate the worm wheel 8, so that the light source holding member 10 holding the light source 9 is moved rightward. That is, the light source 9 is moved in the direction of arrow X so as to be situated, for example, at the slot right end in the light source moving slot 5 of the reflector 4.

When a stepping motor is used as the driving unit 7, the stepping motor is driven, for example, by applying thereto a greater number of driving pulses than the number of driving pulses necessary for moving the light source 9 over the entire movement range.

When the light source holding member 10 is moved in the direction of arrow X, the protrusion member 10a contacts and presses the contact piece 23a of the detection switch 23 fixed in a position within the movement range of the light source 9, so that the contact piece 23a contacts the other contact piece 23b.

FIG. 3 shows a condition where the light source 9 has reached the original position 5a at the slot right end in the light source moving slot 5 of the reflector 4 by the movement of the light source holding member 10. At this time, the contact pieces 23a and 23b are in contacted condition by being pressed by the protrusion member 10a.

After the light source 9 is moved to the original position 5a of one end of the movement range, the control unit 20, the driving circuit 11 and the driving unit 7 operate to move the light source 9 to the other end of the movement range. Specifically, by moving the light source holding member 10 in the direction of arrow Y, the light source 9 moves toward a slot left end 5b which is the other end opposite to the slot right end.

When the light source holding member 10 is moved in the direction of arrow Y, the protrusion member 10a is separated from the detection switch 23 in the course of the movement, so that the condition of the contact pieces 23a and 23b changes from contacting condition to disconnecting condition.

The change of condition of the contact pieces 23a and 23b from contacting condition to disconnecting condition is sensed as a change of an electric signal, so that it is detected that the light source 9 has reached the position where the detection switch 23 is disposed.

The information detecting section of the write-in device 24 detects the number of driving pulses supplied during the time that elapsed from the start of movement of the light source holding member 10 in the direction of arrow Y to the change of the electric signal. The detected number of driving pulses is written into the fixed memory 21 comprising, for example, an EEPROM by the data writing section of the write-in device 24.

The number of driving pulses written in the fixed memory 21 corresponds to the distance by which the light source 9 is moved from the original position 5a to the position where the detection switch 23 is disposed. In other words, in the strobe light, the detected number of driving pulses corresponds to the absolute position of the light-source-position detection unit 22 relative to the reflector 4. The number of driving pulses is used as, for example, the control information for controlling the movement of the light source 9 to set the light emission angle corresponding to the focal length information supplied from the camera.

In an electronic flash of the type which controls the light emission angle by the position of the light source relative to the reflector, the absolute position of the light source relative to the reflector, for example, the distance from one end of the movement range of the light source directly corresponds to the light emission angle. The relationship between the distance and the light emission angle is decided when the flash is designed. Therefore, the number of driving pulses detected by performing the above-described operation can be used as information representative of the focal length or the light emission angle, just as it is.

Consequently, the position of the detection switch 23 where the condition of the contact pieces 23a and 23b changes from contacting condition to disconnecting condition by the movement of the light source holding member 10 can be recognized and used, regardless of positional accuracy in assembly, as a "reference position" for the operation to control the movement of the light source 9 in the strobe light for setting the light emission angle.

For example, a control table is referred to which stores therein the corresponding focal length of a camera lens as the number of driving pulses from the reference position. From the control table, the number of driving pulses is obtained which corresponds to the distance by which the light source 9 is necessarily moved so that the light emission angle corresponds to a specific focal length. Based on the number of driving pulses, the driving of the stepping motor serving as the driving unit 7 is controlled. In this case, in order that the number of driving pulses detected based on the operation of the light-source-position detection unit 22 is the new reference position, the relationship is rewritten between the reference position and the number of driving pulses in the control table. By doing so, even if the light-source-position detection unit 22 which detects and recognizes the reference position is assembled in a condition different from the design due to an assembly error, the driving of the stepping motor serving as the driving unit 7 is controlled in accordance with the relationship between the absolute positions of the reflector 4 and the light source 9 of the strobe light.

Another method is such that without rewriting the control table, information on the difference between the number of driving pulses corresponding to the reference position and the detected number of driving pulses is obtained by calculation. Based on the difference information, for example, the number of driving pulses is corrected which corresponds to the focal length information supplied from the camera. Consequently, even if the light-source-position detection unit 22 is assembled in a condition different from the design due to an assembly error, the driving of the stepping motor serving as the driving unit 7 is controlled in accordance with the relationship between the absolute positions of the reflector 4 and the light source 9 of the strobe light. By any of these methods, the appropriate position to which the light source 9 should be moved is instantly and accurately set.

Hereinafter, a specific example will be described.

Assume now that the variable emission angle strobe light sets the light emission angle for a camera lens with a focal length range of 24 mm to 85 mm. The number of driving steps of a driving signal of the stepping motor serving as the driving unit 7 is obtained from the control table previously stored in the control unit 12. For example, when the focal length of the camera lens is 80 mm, the corresponding number of steps from the reference position is obtained with reference to the control table. By thus obtaining the number of driving steps corresponding the focal length information supplied from the camera, the driving of the stepping motor is controlled.

The control information is obtained based on the operation of the light-source-position detection unit 22 when the light source is first compulsively moved to one end of the movement range and then moved to the other end thereof as described previously. The control information is represented by the number of driving pulses written in the fixed memory 21. It is assumed that the focal length corresponding to the control information is 75 mm.

In this case, the focal length 75 mm is different from the previous focal length 80 mm corresponding to the reference position. Therefore, after the reference position is changed from the position corresponding to the previous focal length 80 mm to the position corresponding to the new focal length 75 mm, the subsequent operation to drive the stepping motor is performed. In the changing operation, for example, correcting operation in the control unit 20 to rewrite the relationship between the number of steps and the corresponding focal length in the initial control table is performed by the correcting section in the control unit 20. Therefore, the driving of the stepping motor is controlled not based on the driving signal obtained from the initial control table but based on the corrected driving signal obtained from the rewritten control table. That is, the stepping motor is driven in accordance with the relationship between the absolute positions of the reflector 4 and the light source 9 and the operation to move and stop the light source 9 is correctly and highly accurately controlled.

Another method is such that difference information "−5" is obtained which is representative of the difference between the focal length 80 mm and the focal length 75 mm. The control table corresponding to the focal length 80 mm is used as it is and the focal length information supplied from the camera is corrected. For example, when a value of 50 mm is supplied as the focal length information from the camera, a difference 50 mm−5 mm=45 mm is calculated by using the difference information "−5". Then, a correction control using the information on the focal length 45 mm of the control table, in other words, a correction control which treats 50 mm as 45 mm is performed. Consequently, the stepping motor serving as the driving unit 7 is driven in accordance with the relationship between the absolute positions of the reflector 4 and the light source 9 of the strobe light. As a result, the operation to move and stop the light source 9 is correctly and highly accurately controlled.

As described above, in the second embodiment, the light source 9 is first compulsively moved to one end of the movement range and then moved to the other end thereof. In the course of the movement to the other end, by detecting that the light source 9 has reached a position preset in the movement range, the distance by which the light source 9 is moved from the one end to the other end is detected and stored as the control information. Based on the stored control information, the operation of the driving unit 7 by the control unit 20 is controlled.

It should be understood that the control methods as described above are based on the same principle as that of the methods for controlling the movement of the light source in the variable emission angle strobe light according to the first embodiment of the present invention.

In the first embodiment, the one end of the movement range of the light source 9 is used as the original position 5*a* for the movement control operation as it is. On the other hand, in the second embodiment, the absolute position of the light source 9 relative to the reflector 4 which position is different from the one end is detected by the light-source-position detection unit 22 and stored in the fixed memory 21. By this operation, the subsequent confirmation of the reference position is made only by detecting the condition change of the detection switch 23 of the light-source-position detection unit 22 from contacting condition to disconnecting condition.

In the first embodiment, since the light source 9 is bumped against the original position 5*a* of the mechanical limit of the light source moving slot 5, some impact is applied to the light source 9, the reflector 4 and the like although the degree of impact can be reduced by selecting an appropriate movement speed. This, basically, is not preferable for devices. In the second embodiment, the number of applications of impact on the light source and the like based on the movement of the light source 9 to the one end is reduced in comparison with the first embodiment.

Instead of the EEPROM employed as the fixed memory 21 in the second embodiment, for example, an erasable programmable read only memory (EPROM) may be employed where data on light distribution is writable by an electric means and the written data is erasable by the electric means. That is, needless to say, the specific structure, function and processing speed of the fixed memory 21 are not limited.

[Third Embodiment]

Figure 4:
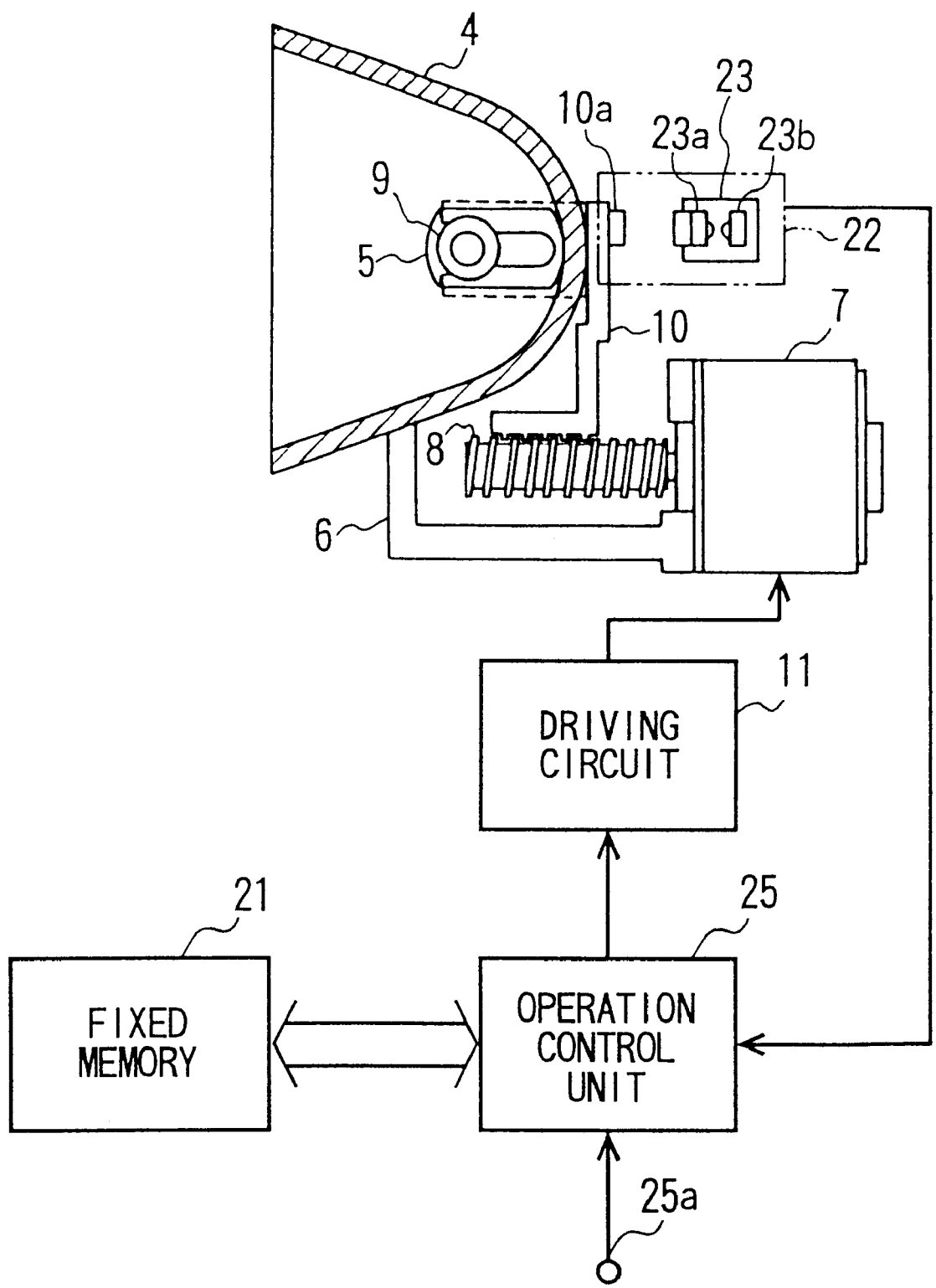
FIG. 4 is a schematic view including a partial cross section, showing the arrangement of a third embodiment of the variable emission angle strobe light according to the present invention.
Figure 5A:
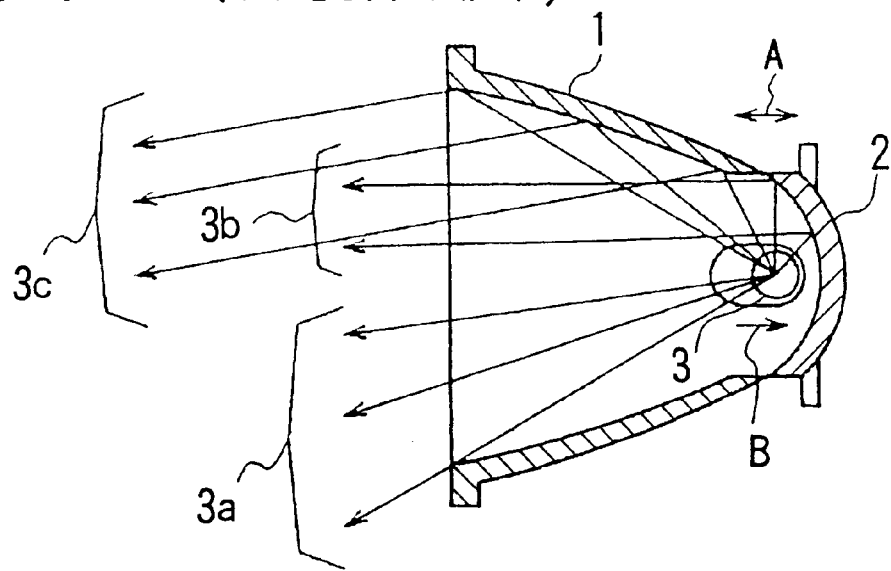
FIG. 5A is a cross-sectional view of assistance in explaining an operation of a light distribution angle varying device of a conventional electronic flash for cameras disclosed in Japanese Published Patent Application Sho 62-51453.
Figure 5B:
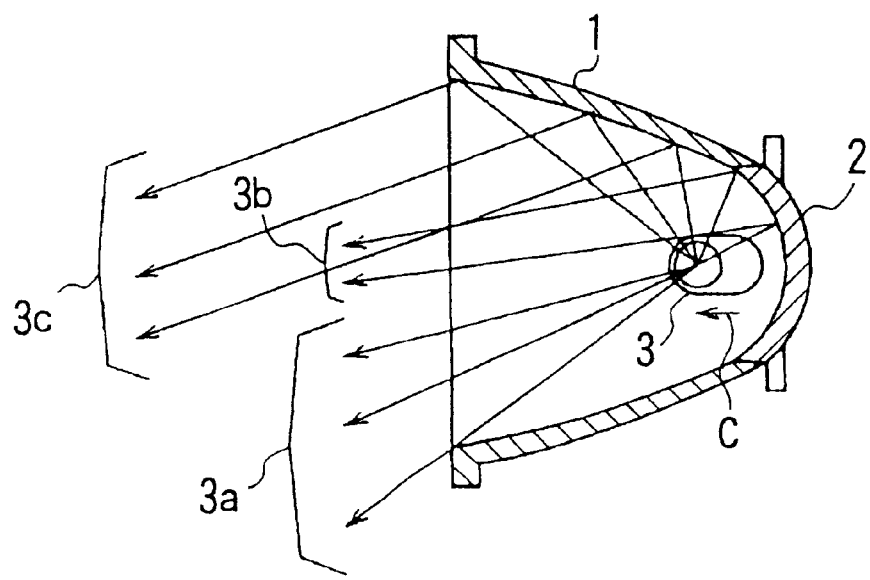
FIG. 5B is a cross-sectional view of assistance in explaining the operation of the light distribution angle varying device.

FIG. 4 is a schematic view including a partial cross section, showing the arrangement of a third embodiment of the variable emission angle strobe light according to the present invention. In the figure, the elements denoted by the same reference designations as those of FIG. 2 are elements having the same functions. In FIG. 4, set focal length information is input to an input terminal 25*a* of an operation control unit 25. The output of the operation control unit 25 is input to the driving circuit 11. The fixed memory 21 is connected to the operation control unit 25.

In the third embodiment, the operations such as the writing operation performed by the write-in device 24 in the second embodiment are performed by the operation control unit 25. That is, the operation control unit 25 is provided with both the functions of the control unit 20 and the write-in device 24 of the second embodiment.

Specifically, the operation control unit 25 has the following functions:

a function to output a driving signal for controlling the operation of the driving unit 7 in response to the input of the set focal length information to the input terminal 25*a*, and supply the driving signal to the driving circuit 11;

a function to detect as the control information the distance by which the light source 9 is moved from one end of the movement range to the position where the light-source-position detection unit 22 operates in the case where the light source is first compulsively moved to the one end of the movement range and then moved to the other end thereof;

a function to write the detected control information into the fixed memory 21 comprising an EEPROM; and a function to correct the driving signal to be supplied to the driving circuit 11 into a corrected driving signal in accordance with the control information written in the fixed memory 21.

The operation control unit 25 may comprise a microcomputer.

With respect to the light emission angle varying operation in the third embodiment, the points in which the third embodiment is different from the previously-described second embodiment will be described below. The third embodiment is different from the second embodiment in the processing of a detection signal for detecting the moving distance by which the light source 9 is moved from one end of the movement range to the position detected by the light-source-position detection unit 22 as the control information. The third embodiment is also different in the writing operation to write the detected control information into the fixed memory 21. Other operations are the same as those of the second embodiment and will not be described in detail.

In the third embodiment, the light source 9 is also first compulsively moved to the original position 5*a* at one end of the movement range. Then, in the course of the movement toward the other end, the operation control unit 25 detects that the light source 9 has reached a position preset by the light-source-position detection unit 22.

Consequently, the operation detection unit 25 detects the distance by which the light source 9 is moved during the above-described operation based on, for example, the number of driving pulses supplied to the driving unit 7 during the time for the light source 9 to be moved from the one end to the preset position. The number of driving pulses representative of the detected movement distance is stored as the control information in the fixed memory 21 comprising an EEPROM, for example.

In the third embodiment, like in the second embodiment, the light emission angle is varied by controlling the subsequent operation of the driving unit 7, for example, by rewriting the control table based on the control information written in the fixed memory 21.

As a result, like in the second embodiment, the operation to move and stop the light source 9, i.e. the light emission angle varying operation is correctly and highly accurately controlled based on the absolute position of the light source 9 relative to the reflector 4.

Instead of the EEPROM employed as the fixed memory 21 in the third embodiment, for example, an EPROM may be employed where data on light distribution is writable by an electric means and the written data is erasable by the electric means. Needless to say, the specific structure, function and processing speed of the fixed memory 21 are not limited.

As described above, in the third embodiment, the light source 9 is first compulsively moved to one end of the movement range and then moved to the other end thereof. In the course of the movement to the other end, it is detected that the light source 9 has reached a preset position, so that the distance by which the light source 9 is moved from the one end to the other end is detected and stored as the control information (the absolute position of the light source 9 relative to the reflector 4). Based on the stored control information, the operation of the driving unit 7 is corrected and controlled. The series of operations are performed by use of electrical processing units such as the operation control unit 25 and the fixed memory 21.

Consequently, the operation to move and stop the light source 9 is correctly and highly accurately controlled, and the reference position and the appropriate stop position of the light source 9 are instantly and accurately obtained with a simple structure without any manual adjustment. As a result, the productivity increases and the product cost is reduced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A variable emission angle strobe light in which a light emission angle is varied by moving a light source in a predetermined movement range defined by a reflector to vary a position of said light source relative to said reflector, said variable emission angle strobe light comprising:

controlling means for setting one end of the movement range as an original position by compulsively moving said light source to said one end, for controlling an operation to move said light source to a desired control position based on said original position which is said one end, and for compulsively moving said light source to said one end at least every time the operation to move said light source to said desired control position is performed a predetermined number of times.

2. A variable emission angle strobe light in accordance with claim 1, wherein said controlling means performs the operation to compulsively move said light source to said one end when power is turned on.

3. A variable emission angle strobe light in accordance with claim 1, wherein said one end is a back side end of said reflector in a light source moving slot provided in said reflector.

4. A variable emission angle strobe light in accordance with claim 2, wherein said one end is a back side end of said reflector in a light source moving slot provided in said reflector.

5. A variable emission angle strobe light in which a light emission angle is varied by moving a light source relative to a reflector by a driving means to vary a position of said light source relative to said reflector, said variable emission angle strobe light comprising:

fixed memory means for storing as control information a distance by which the light source is moved from one end of a movement range of said light source to a position preset in said movement range of said light source when said light source reaches the preset position while being moved from said one end to the other end in said movement range; and controlling means for first compulsively moving said light source to said one end of said movement range and then moving said light source to the other end of said movement range and for controlling the operation by said driving means to move said light source based on said control information stored in said fixed memory means.

6. A variable emission angle strobe light comprising:

a light source for emitting strobe light;

a reflector for reflecting said strobe light;

driving means for moving said light source so that a position of said light source relative to the reflector varies;

a driving circuit for driving said driving means in accordance with a predetermined driving signal;

light-source-position detection means for detecting that said light source has reached a position preset in a movement range of said light source;

fixed memory means including an information detecting section and a writing section, said information detecting section detecting as control information a distance by which said light source is moved from one end of said movement range to a position where said light-source-position detection means operates while said light source is being moved to the other end of said movement range after moved to said one end, said writing section writing said control information into said fixed memory means; and controlling means for outputting said driving signal for controlling said driving means in response to an input of set focal length information corresponding to a focal length of a camera lens set in a camera and supplying said driving signal to said driving circuit, said controlling means including a correcting section for correcting said driving signal based on said control information written in said fixed memory means and generating a corrected driving signal.

7. A variable emission angle strobe light comprising:

a light source for emitting strobe light;

driving means for moving said light source so that a position of said light source relative to a reflector varies;

a driving circuit for driving said driving means in accordance with a predetermined driving signal;

light-source-position detection means for detecting that said light source has reached a position preset in a movement range of said light source;

operation control means for outputting a driving signal for controlling the driving means in response to an input of set focal length information corresponding to a focal length of a camera lens set in a camera and supplying said driving signal to said driving circuit, said operation control means including an information detecting section for detecting as control information a distance by which said light source is moved from one end of the movement range to a position where said light-source-position detection means operates in the case where said light source is first compulsively moved to the one end of the movement range and then moved to the other end; and fixed memory means including a data writing section and a correcting section, said data writing section writing the control information into said fixed memory means, said correcting section correcting said driving signal based on the control information written in said fixed memory means and outputting a corrected driving signal.

8. A variable emission angle strobe light in accordance with claim 5, wherein
said one end is a back side end of the reflector.
9. A variable emission angle strobe light in accordance with claim 6, wherein
said one end is a back side end of the reflector.
10. A variable emission angle strobe light in accordance with claim 7, wherein
said one end is a back side end of the reflector.
11. A variable emission angle strobe light in accordance with claim 6, wherein
said fixed memory means is an electrically erasable programmable read only memory.
12. A variable emission angle strobe light in accordance with claim 7, wherein
said fixed memory means is an electrically erasable programmable read only memory.
13. A method for controlling a movement of a light source in a variable emission angle strobe light in which a light emission angle is varied by moving said light source relative to a reflector by driving means to vary a position of said light source relative to said reflector, said method comprising the steps of:
after compulsively moving said light source to one end of a movement range of said light source, moving said light source to the other end of said movement range;
while said light source is being moved to the other end, detecting that said light source has reached a position preset in said movement range;
when it is detected that said light source has reached the preset position, detecting and storing as control information a distance by which said light source is moved from the one end to the preset position; and
controlling the movement of said light source by said driving means based on the stored control information.
14. A method for controlling the movement of the light source in the variable emission angle strobe light in accordance with claim 13, wherein
said one end is a back side end of the reflector.
15. A method for controlling a movement of a light source in a variable emission angle strobe light in which a light emission angle is varied by moving said light source in a movement range defined by a reflector to vary a position of said light source relative to said reflector, said method comprising the steps of:
setting one end of said movement range as an original position by compulsively moving said light source to the one end;
controlling a movement of said light source to a desired control position based on said original position which is the one end; and
moving the compulsively said light source to the one end at least based on how many times the light source has been moved to the desired control position.

* * * * *